US008634679B2

(12) United States Patent
Little (10) Patent No.: US 8,634,679 B2
(45) Date of Patent: Jan. 21, 2014

(54) TUNABLE OPTICAL FILTER

(75) Inventor: Brent E. Little, Glen Head, NY (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 12/210,487

(22) Filed: Sep. 15, 2008

(65) Prior Publication Data

US 2010/0067843 A1    Mar. 18, 2010

(51) Int. Cl.
*G02F 1/295* (2006.01)

(52) U.S. Cl.
USPC .......................................................... 385/5

(58) Field of Classification Search
USPC .......................................................... 385/5
See application file for complete search history.

(56) References Cited

U.S. PATENT DOCUMENTS

| | | | |
|---|---|---|---|
| 6,463,186 B1* | 10/2002 | Li ..................................... | 385/39 |
| 2003/0030814 A1* | 2/2003 | Osinski et al. ................. | 356/461 |
| 2003/0235367 A1* | 12/2003 | Yamazaki ........................ | 385/39 |
| 2004/0141691 A1* | 7/2004 | Wiesmann et al. ............. | 385/40 |
| 2007/0230856 A1* | 10/2007 | Yamazaki ........................ | 385/5 |
| 2008/0219614 A1* | 9/2008 | Gill et al. .......................... | 385/3 |
| 2009/0028555 A1* | 1/2009 | Webb et al. ..................... | 398/27 |
| 2009/0092350 A1* | 4/2009 | Gill .................................... | 385/3 |

* cited by examiner

*Primary Examiner* — Ryan Lepisto
*Assistant Examiner* — Jerry Blevins
(74) *Attorney, Agent, or Firm* — David L. Soltz (57) ABSTRACT

Consistent with the present disclosure an optical filter is provided that preferably includes a plurality of looped or ring-shaped waveguides provided on a substrate which are coupled to one another by tunable couplers. Portions of each waveguide constitute part of each tunable coupler, which may include, for example, a Mach-Zehnder interferometer. A heater may be thermally coupled to one or both arms of the Mach-Zehnder interferometer, to thereby adjust an amount of optical coupling between adjacent looped waveguides. The filter bandwidth (i.e., the spectral width of the passband), which, as noted above, is related to such coupling, can thus also be tuned or varied. Additional heaters may be provided to tune the center wavelength of the passband so that a filter having both a variable passband spectral width and center wavelength can be obtained.

13 Claims, 10 Drawing Sheets

TUNABLE OPTICAL FILTER

BACKGROUND

Optical filters including optical ring resonators are known. In such optical filters, a waveguide in a closed loop or ring is coupled to one or more input/output waveguides. If the circumference of the looped waveguide equals an integral number of wavelengths (resonant wavelengths) of incoming light supplied on the input waveguide, and the coupling ratio is relatively low, the intensity of the incoming light will increase over multiple passes around the ring due to constructive interference. Light at the resonant wavelength can then be output on the output waveguide through optical coupling between the looped waveguide and the output waveguide. Light at other wavelengths, however, will be suppressed in the looped waveguide due to destructive interference.

Conventional optical ring resonators may also include a heater to thermally vary the refractive index and thus the optical path length around the looped waveguide. By changing the optical path of the looped waveguide, the resonant wavelength may also be changed, thereby allowing the optical ring resonator to act as a tunable filter.

Multiple waveguide rings can be coupled to one another to provide a filter having a passband over a particular range of wavelengths. The spectral width of the passband of the filter depends on the amount of optical coupling or coupling ratio between adjacent rings. Since ring dimensions (e.g., the circumference and waveguide width) are substantially fixed, the spectral width of the passband, i.e., the filter bandwidth, is also fixed, even though the center wavelength of the passband may be thermally tuned.

Accordingly, a filter having both a center wavelength and passband that is tunable would be desirable.

SUMMARY

Consistent with the present disclosure, an optical filter is provided that comprises a substrate and an input waveguide provided on the substrate which configured to receive an optical signal. A first looped waveguide is also provided on the substrate, as well as a first Mach-Zehnder interferometer. A first portion of the first looped waveguide and a portion of the input waveguide constitute first and second arms, respectively, of the first Mach-Zehnder interferometer. A second looped waveguide and a second Mach-Zehnder interferometer are further provided on the substrate. A second portion of the first looped waveguide and a portion of the second looped waveguide constitute first and second arms, respectively, of the second Mach-Zehnder interferometer. A first heater is thermally coupled to one of the first and second arms of the first Mach-Zehnder interferometer, and a second heater is thermally coupled to one of the first and second arms of the second Mach-Zehnder interferometer. The first heater is configured to adjust a refractive index of one of the first and second arms of the first Mach-Zehnder interferometer to thereby adjust an amount of a first optical coupling between the first looped waveguide and the input waveguide. In addition, the second heater is configured to adjust a refractive index of one of the first and second arms of the second interferometer to thereby adjust an amount of a second optical coupling between the first looped waveguide and second waveguide.

Consistent with an additional aspect of the present disclosure, an optical filter is provided that includes a substrate and a plurality of looped waveguides provided on the substrate. Each of the plurality of looped waveguides is configured as a closed loop. A plurality of tunable couplers is also provided on the substrate. Each of the plurality of tunable couplers includes a corresponding portion of each of the plurality of looped waveguides. In addition, each of the plurality of tunable couplers is configured to adjust an amount of optical coupling between corresponding adjacent ones of the plurality of looped waveguides.

Consistent with a further aspect of the present disclosure, an optical receiver circuit is provided that includes an optical filter configured to receive a plurality of optical signals, each of which having a corresponding one of a plurality of wavelengths. The optical filter is further configured to supply an optical output. The optical filter includes a plurality of looped waveguides provided on the substrate, each of which being configured as a closed loop. In addition, the optical filter includes a plurality of tunable couplers provided on the substrate. Each of the plurality of tunable couplers includes a corresponding portion of each of the plurality of looped waveguides, and each of the plurality of tunable couplers is configured to adjust an amount of optical coupling between corresponding adjacent ones of the plurality of looped waveguides. The optical receiver circuit also includes a photodetector configured to receive the optical output from the optical filter and generate an electrical output. In addition, the optical receiver circuit includes a control circuit configured to generate a control signal in response to the electrical output, such that the plurality of tunable couplers adjust the amount of the optical coupling between corresponding adjacent ones of the plurality of looped waveguides in response to the control signal.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Consistent with the present disclosure an optical filter is provided that preferably includes a plurality of looped or ring-shaped waveguides which are coupled to one another by tunable couplers. Portions of each waveguide constitute part of each tunable coupler, which may include, for example, a Mach-Zehnder interferometer. A heater may be thermally coupled to one or both arms of the Mach-Zehnder interferometer, to thereby adjust an amount of optical coupling between adjacent looped waveguides. The filter bandwidth (i.e., the spectral width of the passband), which, as noted above, is related to such coupling, can thus also be tuned or varied. Additional heaters may be provided to tune the center wavelength of the passband so that a filter having both a variable passband spectral width and center wavelength can be obtained.

Reference will now be made in detail to the present exemplary embodiments, which are illustrated in the accompanying drawings. Wherever possible, the same reference characters will be used throughout the drawings to refer to the same or like parts.

Figure 1:
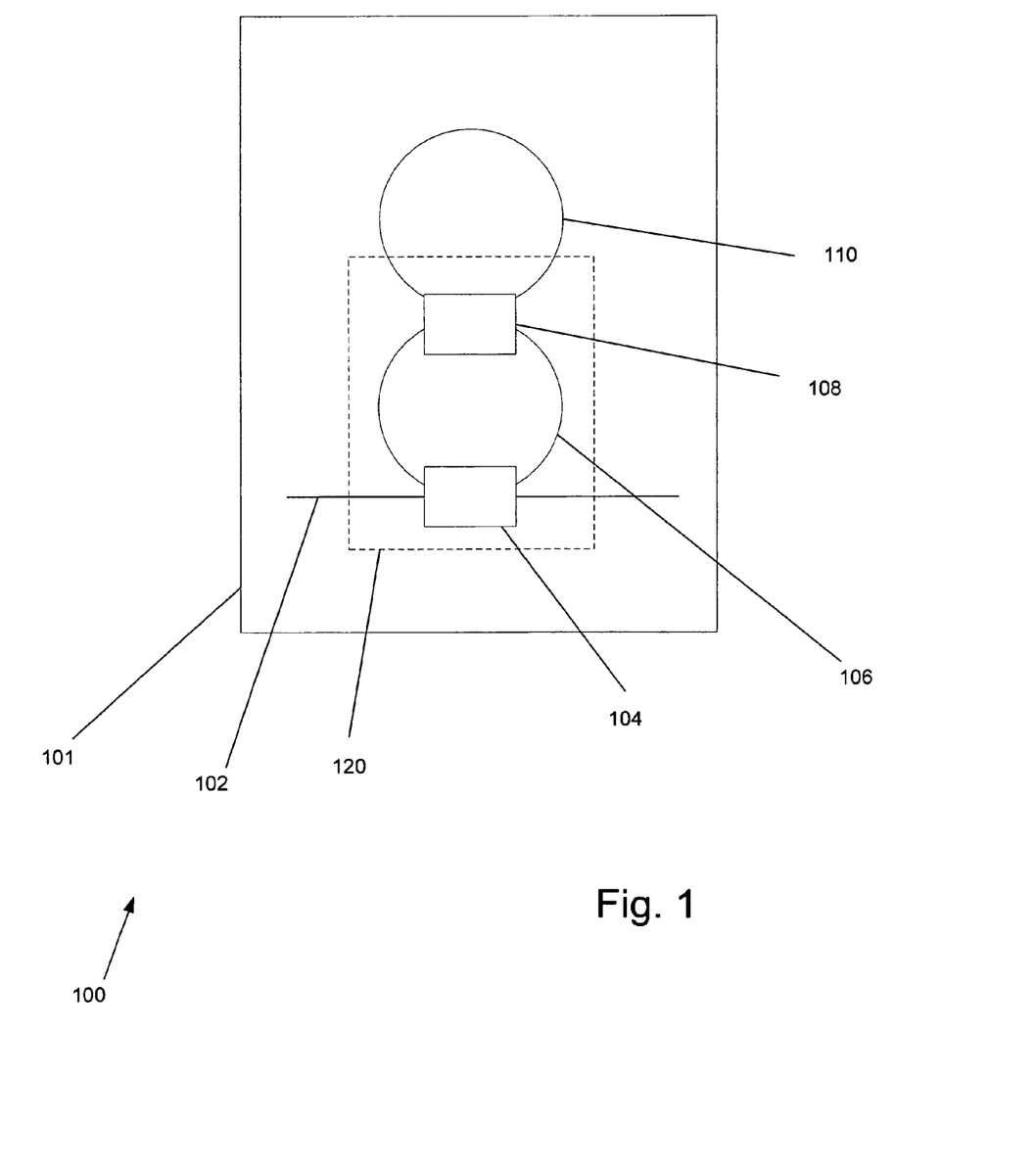
FIG. 1 is a block diagram of an optical filter consistent with an aspect of the present disclosure.

FIG. 1 illustrates an optical filter 100 consistent with an aspect of the present disclosure. Optical filter 100 includes an input bus or input waveguide 102 provided on a substrate 101. Waveguide 102 is configured to receive a plurality of optical signals from the left in FIG. 1. Each of the plurality of optical signals has a corresponding one of a plurality of wavelengths. The plurality of optical signals are fed to a tunable coupler 104, which is configured as a power splitter to supply a portion of each optical signal to closed-loop waveguide 106. Closed-loop waveguide 106, in turn, is optically coupled to closed-loop waveguide 110 via tunable coupler 108.

The optical signals circulate in closed-loop waveguides 106 and 110, and due to constructive interference in these waveguides, selected optical signals at or near particular wavelengths, referred to as resonant wavelengths, are output on output on waveguide 102 to the right in FIG. 1 (the resonant wavelengths are related to the circumference of closed-loop waveguides 106 and 110, such that the circumference is equal to an integer number of such wavelengths). If the coupling between closed-loop waveguide 106 and closed loop waveguide 110 is relatively weak (i.e., a low coupling ratio or low amount of optical coupling), optical signals having wavelengths at or near the resonant wavelengths associated with closed-loop waveguides 106 and 110 will propagate in these waveguides, but a small amount of the optical energy in these waveguides will be output on waveguide 102. Accordingly, for example, if the coupling ratio is 1%, the output will be 1% of the optical energy circulating in waveguides 106 and 110. If the amount of such energy accumulates to 100 times the input optical energy, the output optical energy will be 1% of input energy, and will thus equal the amount of input energy (1% of 100 is equal to 1). However, there will be a relatively long delay for this amount of output optical energy to be generated because a relatively large amount of light must first accumulate in the closed-loop waveguides 106 and 110.

On the other hand, if the coupling between waveguides 106 and 110 is relatively strong (a high coupling ratio or a large amount of optical coupling), light at or near the resonant wavelengths need not accumulate in waveguides 106 and 110 before being output at a significant level. Rather, light at wavelengths other than these wavelengths will leak out and be output from the closed-loop waveguides 106 and 110. Namely, light having wavelengths within a relatively large band of wavelengths about the resonant wavelength will be output. Thus, by controlling the amount of optical coupling between the closed loop waveguides 106 and 110, as well as waveguide 102, the spectral width of this band, i.e., the spectral width of the passband (bandwidth), can also be controlled. Moreover, the delay experienced by optical signals input to 100 can also be controlled, whereby a relatively large delay is associated with low coupling ratios (because light must first accumulate in the rings before a significant amount is output) and a relatively short delay is associated with higher coupling ratios (because the closed loop waveguides 106 and 110 tend to leak or release more light when the coupling ratios are high, and light need not accumulate at a particular wavelength in order to be output at a significant level).

Figure 3:
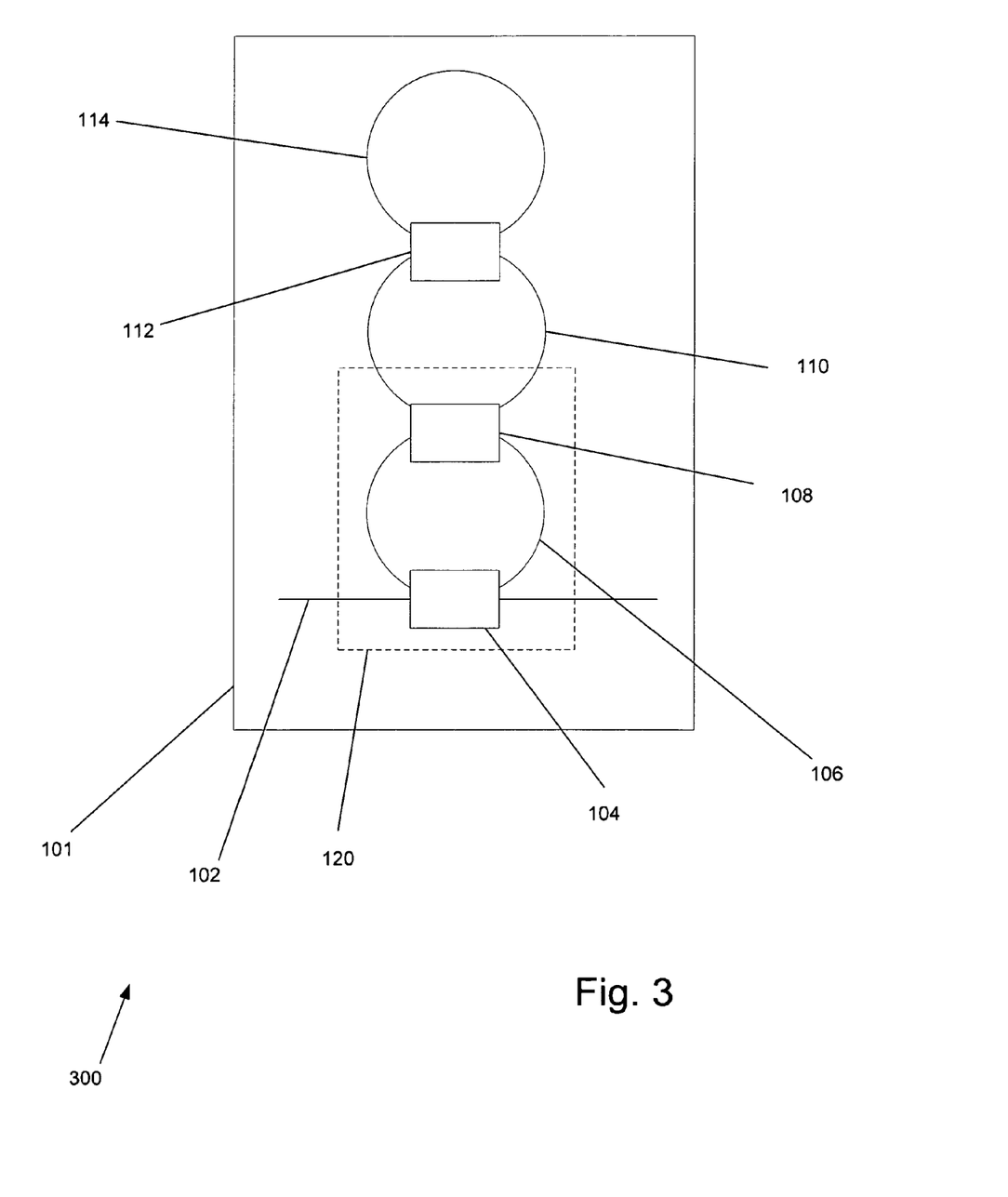
FIG. 3 is a block diagram of an optical filter consistent with an additional aspect of the present disclosure.
Figure 4:
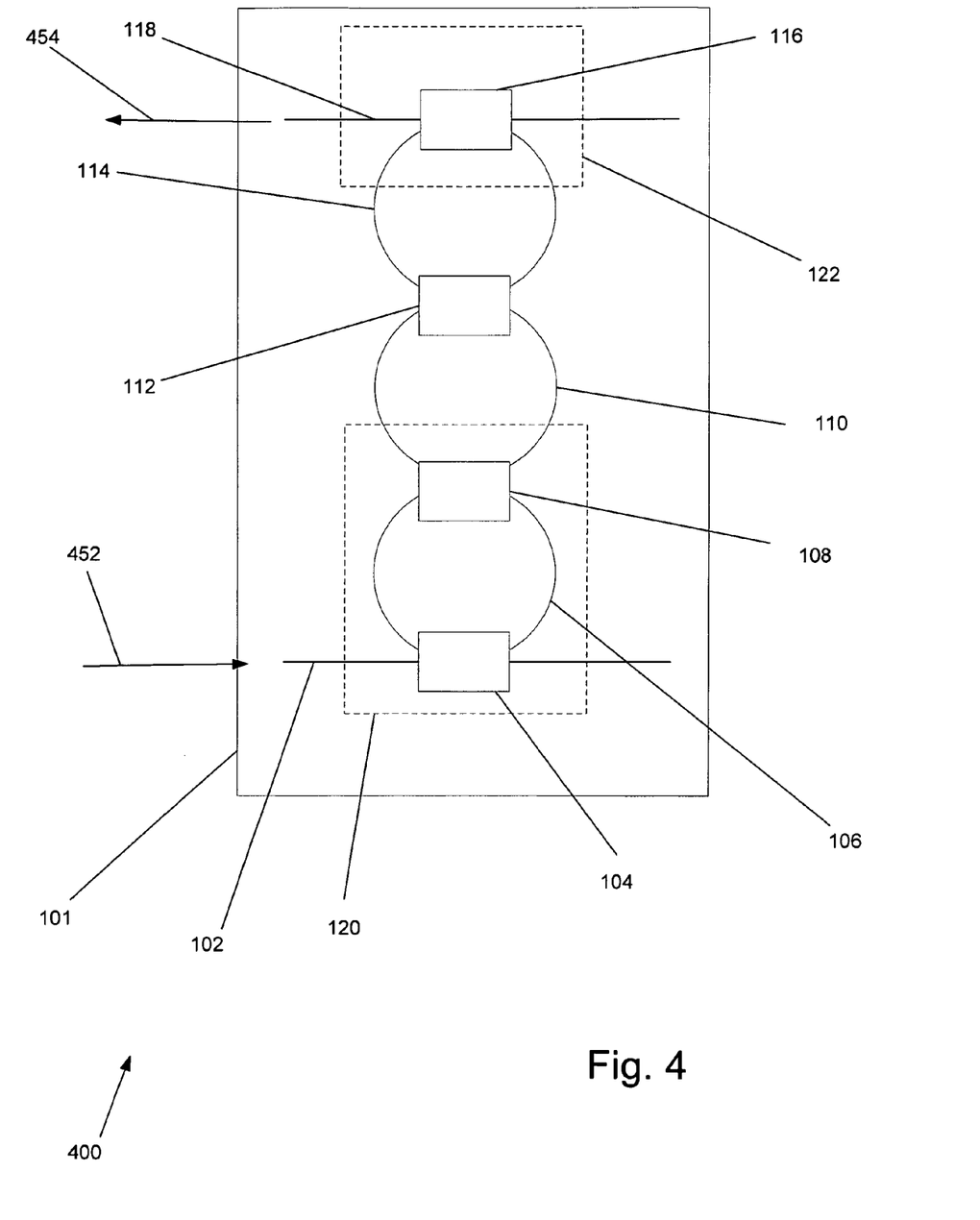
FIG. 4 is a block diagram of an optical filter consistent with another aspect of the present disclosure.

The bandwidth of an optical amplitude filter (an example of which is shown in FIG. 4, discussed in greater detail below), or the magnitude of the dispersion in an all-pass filter (or delay filter, examples of which are shown in FIGS. 1 and 3), may also be cast in terms of "resonator-Q". Filter bandwidth and dispersion are proportional to resonator-Q. Resonator-Q, in turn, is related to the physical attributes (refractive index, and geometry) of the filter. In particular, resonator-Q is related to the coupling values between the input/output waveguide or bus and the closed-loop waveguides, and from closed-loop waveguide to closed-loop waveguide. Decreasing the coupling values of the tunable couplers increase the resonator-Q, and vise-versa. Therefore tuning the coupling values of the tunable couplers discussed above directly affect bandwidth and dispersion.

Figure 2:
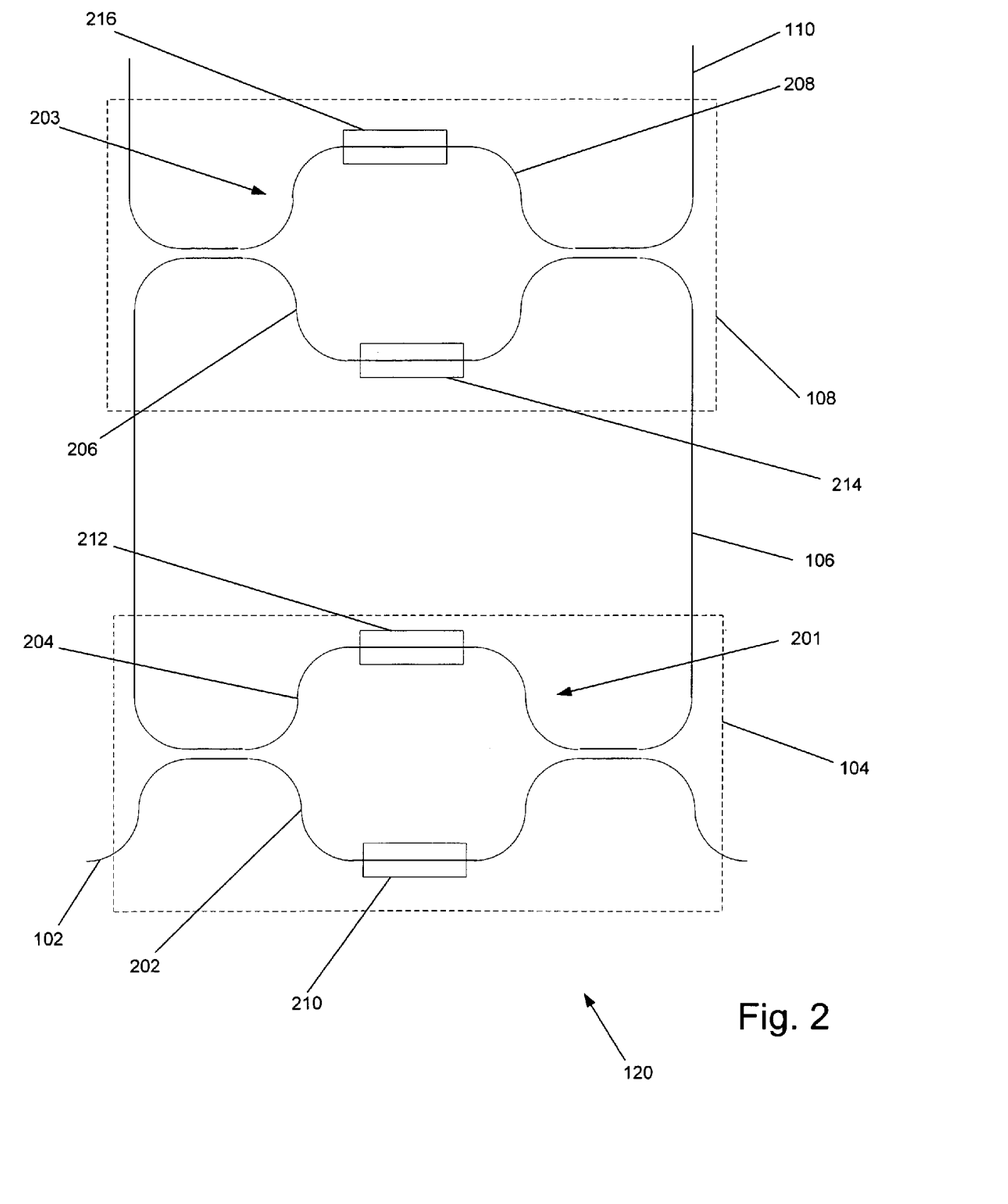
FIG. 2 is a detailed diagram of a first portion of an optical filter consistent with the present disclosure.

FIG. 2 illustrates portion 120 of optical filter 100 in greater detail. As seen in FIG. 2, first tunable coupler 104 is, for example, a Mach-Zehnder interferometer 201. A portion 202 of input waveguide 102 constitutes a first arm of Mach-Zehnder interferometer 201 and a portion 204 of closed-looped waveguide 106 constitutes a second arm of Mach-Zehnder interferometer 201. Preferably, heaters 210 and 212 (which may include thin film heaters, for example) are respectively thermally coupled to portions 202 and 204 to thermally change the refractive index of such portions, and thus the phase of light propagating in each arm, i.e., the optical length of each arm. Accordingly, since the length of each arm is varied, the optical coupling between waveguide 102 and closed-loop waveguide 106 is also varied.

As further shown in FIG. 2, tunable coupler 108 includes another Mach-Zehnder interferometer 203, a second portion 206 of closed-loop waveguide 106 constitutes a first arm of Mach-Zehnder interferometer 203 and portion 208 of closed-loop waveguide 110 constitutes the second arm. Heaters 214 and 216, are coupled to portions 206 and 208, respectively, and thus adjust the amount of optical coupling between closed-loop waveguide 106 and closed-loop waveguide 110, and, as a result, the bandwidth of optical filter 100, as well as the delay of optical signals at particular wavelengths propagating through optical filter 100, can be varied or controlled.

FIG. 3 illustrates an alternative tunable filter 300 consistent with the present disclosure. Tunable filter 300 is similar to filter 100 but includes an additional closed-loop waveguide 114 and tunable coupler 112. The operation and structure of closed-loop waveguide 114 and tunable coupler 112 is similar to that of closed-loop waveguide 110 and tunable coupler 108, respectively. Consistent with the present disclosure any appropriate number of closed-loop waveguide and tunable couplers may be provided. By increasing the number of these elements, the bandwidth and delay discussed above may be more finely tuned.

Filter 300 is an example of a filter that may be used for chromatic dispersion compensation (filter 100 shown in FIG. 1 may also be used for chromatic dispersion compensation). By way of background, light at different wavelengths may propagate at different speeds along an optical fiber, an effect often referred to as "chromatic dispersion." Often, optical pulses include light at different wavelengths, and, thus, such pulses may temporally spread as they travel along a relatively long length of fiber. Accordingly, at the receive end of the fiber, light at the faster wavelengths may be delayed relative to light propagating at the slower wavelengths so that the wavelength components of the pulses can be aligned.

An optical signal can be supplied to filter 300 on waveguide 102 to the left of tunable coupler 104. As noted above, such light will circulate in closed-loop waveguides 106, 110, and 114. If light within the optical signal is at a fast wavelength, such light should preferably be aligned relative to light at the slower wavelengths within the optical signal. Accordingly, the coupling ratios of tunable couplers 104, 108, and 112 may be adjusted such that the appropriate delay is achieved and chromatic dispersion compensation is obtained. As noted above, the coupling ratios or the amount of coupling can be changed by varying the temperature of the heaters in each of the Mach-Zehnder interferometers of tunable couplers 104, 108, and 112.

FIG. 4 illustrates tunable filter 400 consistent with another example of the present disclosure. Tunable filter 400 is similar to filter 300 but includes an addition tunable coupler 116 and an output waveguide or bus 118. Filter 400 acts as an amplitude filter, whereby wavelengths outside a given passband are blocked while others within the passband are transmitted. In this example, optical signals at various wavelengths are input to the filter through input waveguide 102, as indicated by arrow 452, and the passed wavelengths are supplied from output waveguide 118 as indicated by arrow 454. As discussed above, by adjusting the coupling ratios between closed-loop waveguides 106, 110, and 114 with corresponding tunable couplers 104, 108, 112, and 116 the spectral width of the passband can be varied.

It is noted that an output waveguide, similar to output waveguide 118, may be coupled to closed-loop waveguide 110 in filter 100, such that filter 100 may also serve as an amplitude filter.

Figure 5:
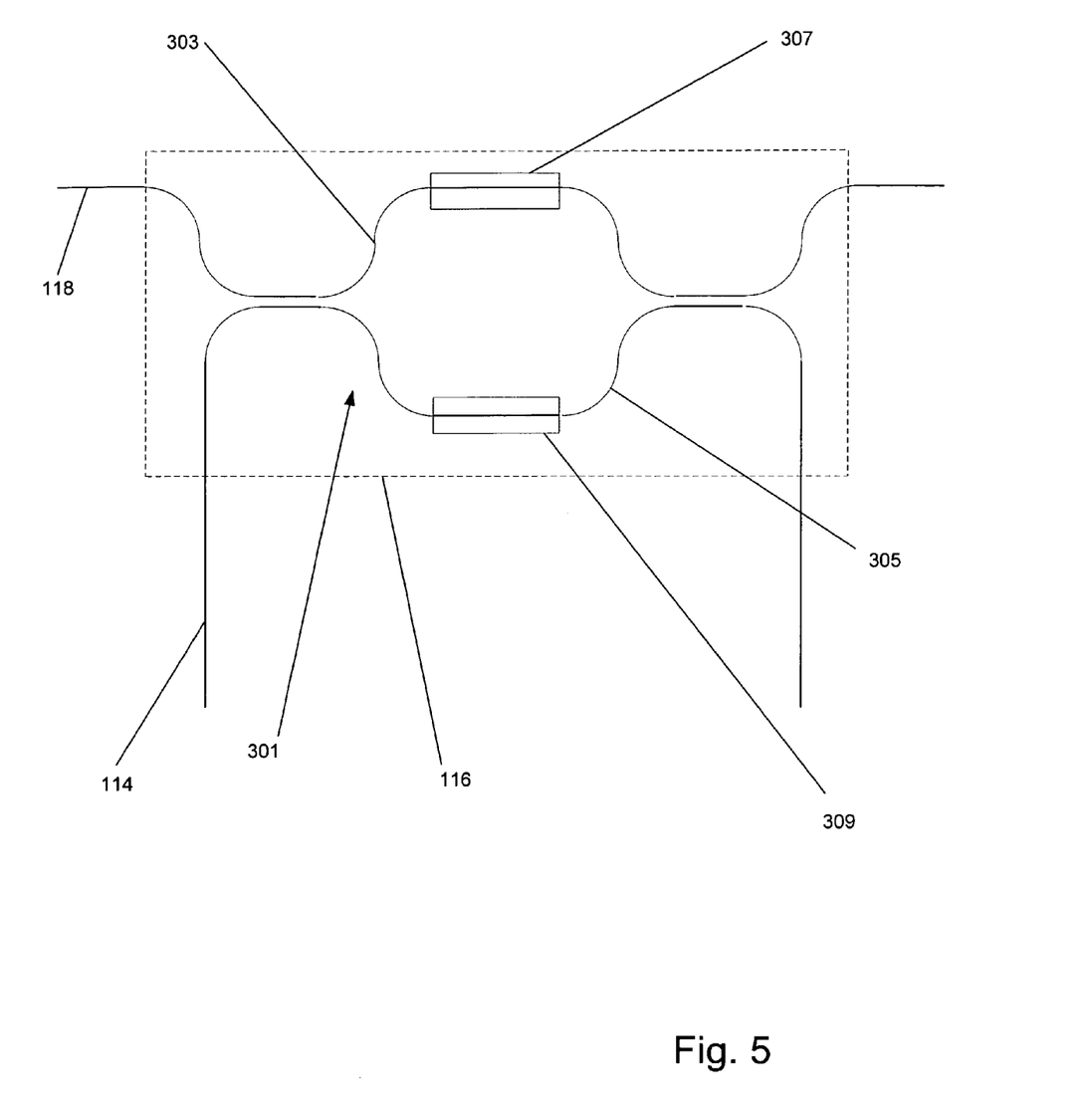
FIG. 5 is a detailed diagram of a portion of the optical filter shown in FIG. 4.

FIG. 5 illustrates tunable coupler 116 in greater detail (see portion 122 of FIG. 4). Tunable coupler 116 includes, for example, Mach-Zehnder interferometer 301, whereby a portion 305 of closed-loop waveguide 114 constitute a first arm of Mach-Zehnder interferometer 301 and portion 303 of output waveguide 303 constitutes a second arm. Heaters 307 and 309, including, for example, thin film heaters, may be thermally coupled to portions 303 and 305, respectively, to thermally adjust the refractive index, and thus, the optical path length of the arms of Mach-Zehnder interferometer 301. As a result, the amount of coupling between waveguide 118 and closed-loop waveguide 114 is also adjusted.

Figure 10:
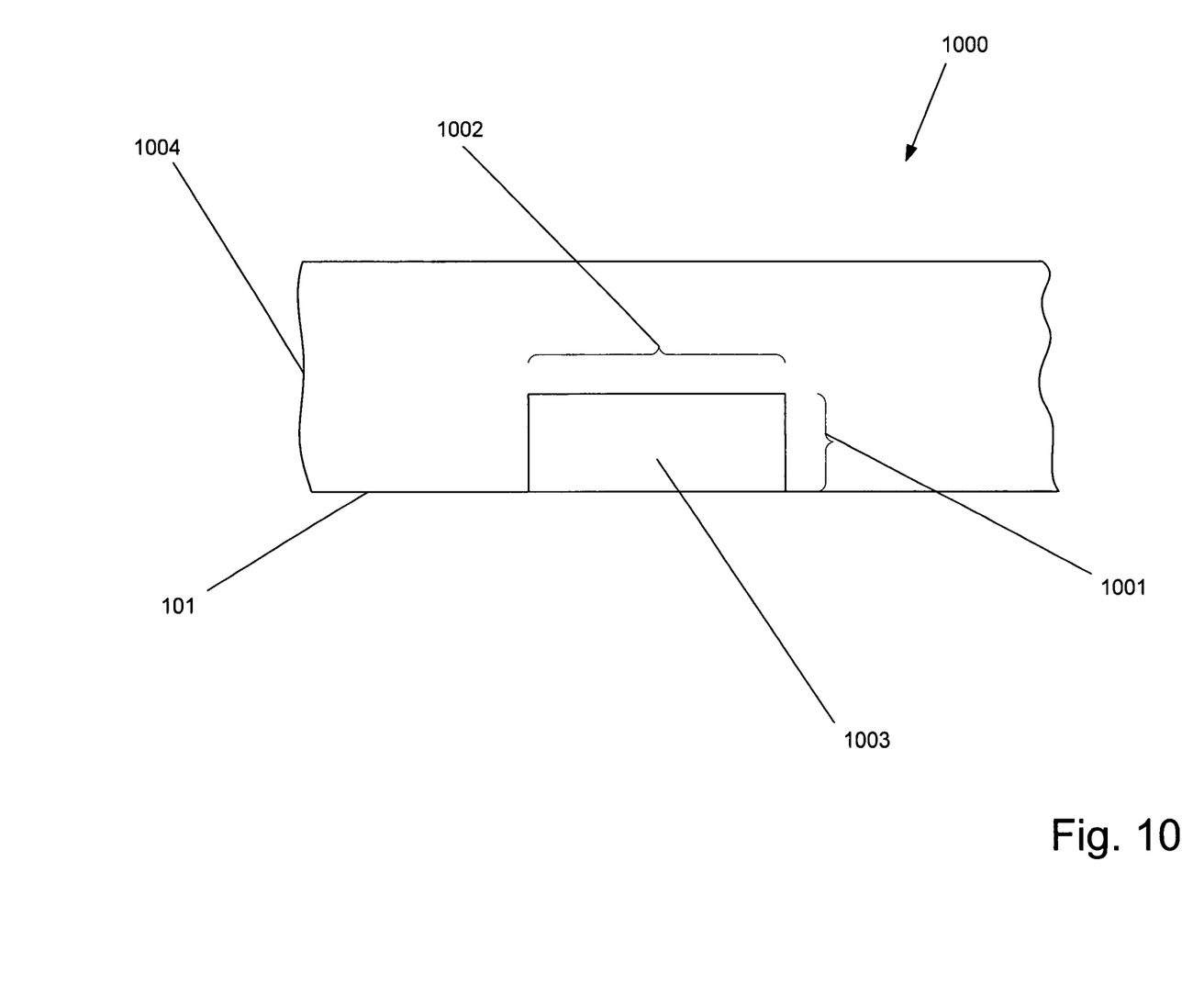
FIG. 10 illustrates a cross-sectional view of a waveguide consistent with an aspect of the present disclosure.

Waveguides 102 and 118, as well as the closed-loop waveguides 106, 110, and 114 are typically made of a commercially available high index contrast dielectric material, such as silicon oxynitride (SiON), silicon oxycarbide (SiOC), doped silica, doped glasses, silicon, polymers, InP, GaAs, InGaAs (and other IIIV materials and quaternaries), or Hydex, which is commercially available from Infinera Corporation. FIG. 10 illustrates an exemplary cross-section 1000 of one of these waveguides. The height 1001 and width 1002 of waveguide core 1003 may each be, for example, 1.5 μm. In addition, cladding 1004 may have a refractive index of 1.45 while core 1003 may have a refractive index of 1.7. Each of closed-loop waveguides 114, 110 and 106 may have a radius of 300 μm, for example.

Figure 6:
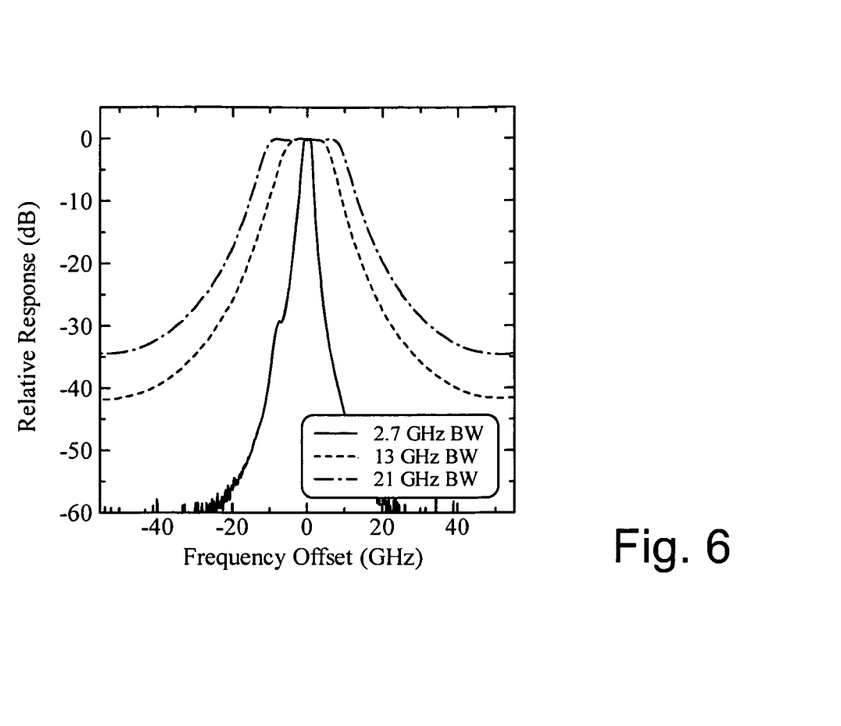
FIGS. 6-8 are response curves of optical filters consistent with the present disclosure.
Figure 7:
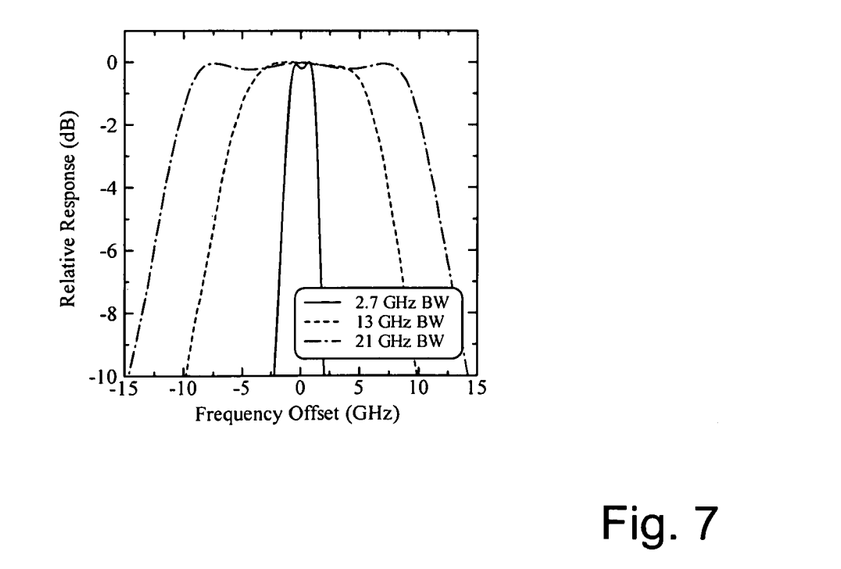
Figure 8:
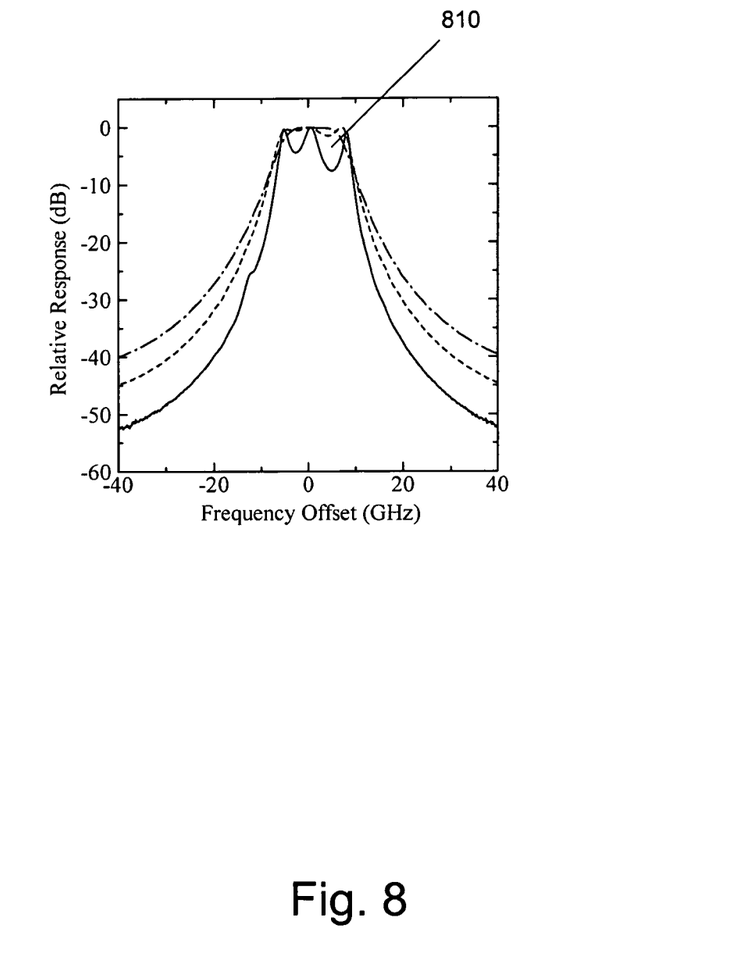

The coupling ratio of each of tunable couplers 104, 108, 112, and 116 can be varied from 0% to 100% so that a relatively large range of passband widths can be achieved. The wide range of passband widths can be obtained by appropriately adjusting the temperatures of each of the heaters in variably couplers 104, 108, 112, and 116. FIGS. 6-8 illustrate examples of different measured filter response or transmission spectra that can be achieved with a tunable filter consistent with the present disclosure. Specifically, in FIG. 6, the filter is tuned to have different 3 dB bandwidths of 2.7 GHz (solid line), 13 GHz (dashed line), and 21 GHz (dashed-dot line), and FIG. 7 is an enlarged view of the transmission spectra shown in FIG. 6, but more clearly showing a relatively constant transmission of nearly 100% in the passband. That is, the ripple in the passband less than 0.2 dB. In this example, the filter had a loss less than 0.5 dB. In FIGS. 6 and 7, the passband is taken as the range of frequencies having a transmission of −3 dB or greater.

In certain filter applications, however, greater roll-off of the passband may be desirable. Accordingly, consistent with a further aspect of the present disclosure, the ring-to-ring tunable couplers (e.g., couplers 108 and 112) may be tuned (through the heaters present in these couplers) to have a relatively high coupling ratio compared to that of the bus-to-ring couplers (e.g., couplers 104 and 116) to yield increased roll-off of the passband. FIG. 8 illustrates, by way of example, that higher roll-off can be achieved at the sides of the passband (solid curve) but with higher in-band ripple. As the amount of ripple is reduced, the passband is relatively smooth (dashed curve), however, and, the roll-off becomes less steep. Moreover, if the ripple is reduced even further (dash-dot curve), the roll-off is even less steep. Thus, in light of FIG. 8, a trade-off exists between the amount of ripple and the steepness of the roll-off at the sides of the passband. In FIG. 8, the passband is the range of frequencies having a transmission of −3 dB or greater, including ripple 810 shown in the figure.

Other types of line shapes may be generated. Further, the thermal controls and resulting variable coupling discussed above may be used to mitigate fabrication induced variations of the coupling coefficients of the tunable couplers (e.g., 104, 108, 112, and 116), and thus be used to optimize performance of filters post-fabrication.

Figure 9:
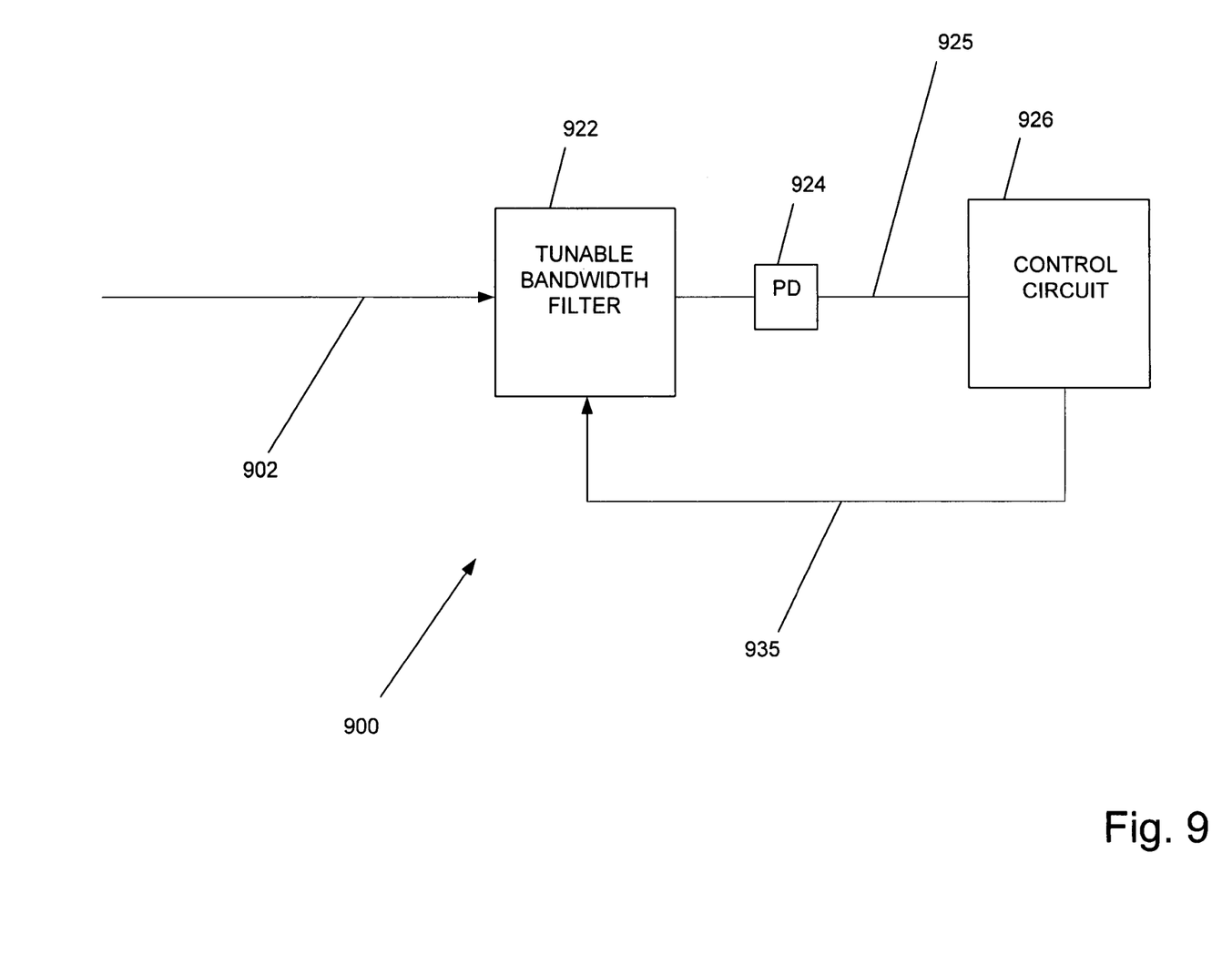
FIG. 9 is a block diagram of an optical receiver circuit consistent with a further aspect of the present disclosure.
Figure 11:
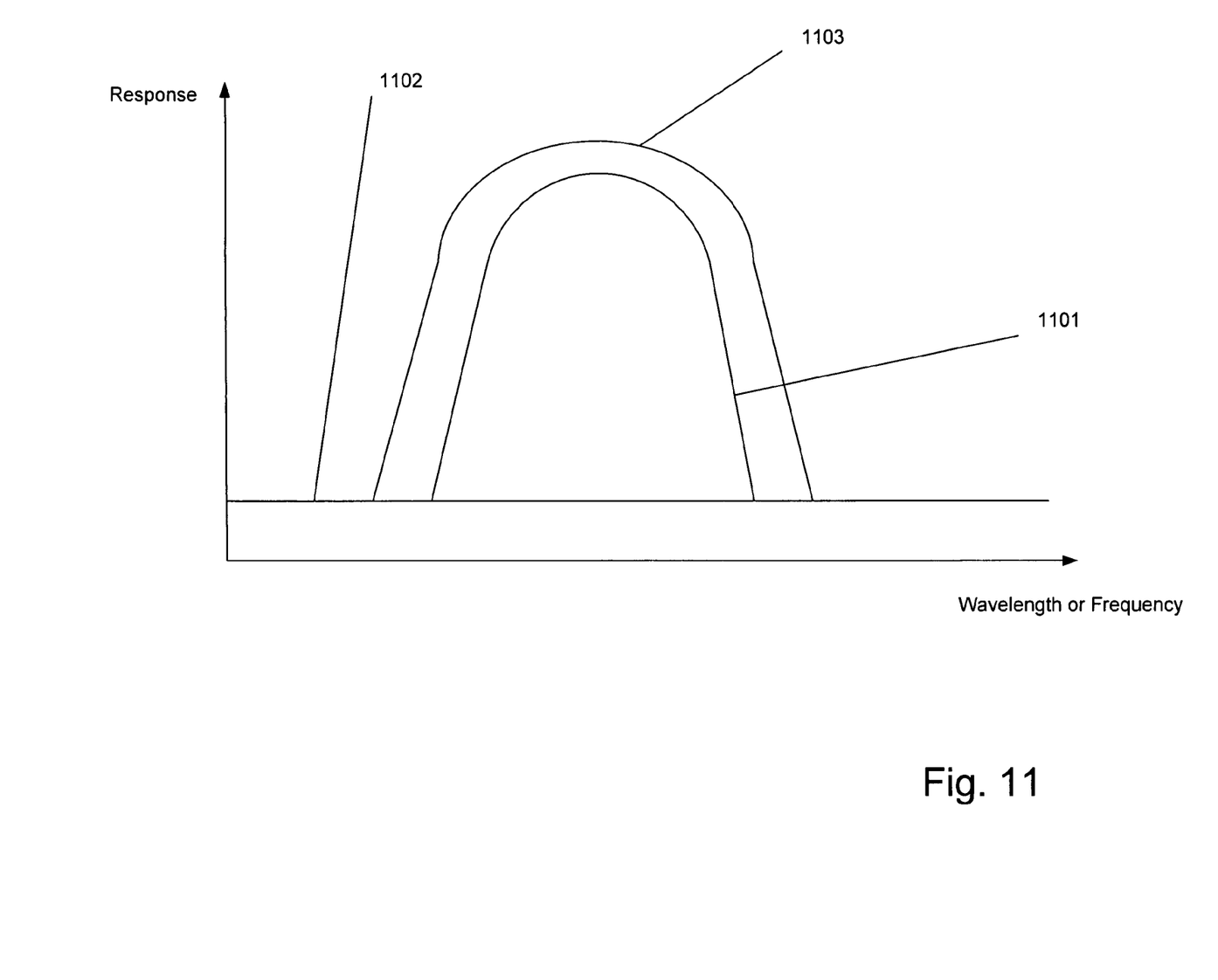
FIG. 11 illustrates exemplary spectra consistent with an additional aspect of the present disclosure.

FIG. 9 illustrates an optical receiver circuit 900 consistent with a further aspect of the present disclosure. Receiver circuit 900 includes a tunable filter 922 configured to receive an optical signal represented by arrow 902. The optical signal is typically modulated, and therefore has spectral envelope associated with it. The optical signal preferably passes through tunable filter 922 and is fed as an optical output to photodetector or photodiode 924. Tunable filter 922 preferably includes two or more closed-loop waveguide coupled to one another by a variable coupler, as discussed above. For example, tunable filter 922 may have the same or similar construction as filter 400 discussed above. In connection with the embodiment shown in FIG. 9, tunable filter 922 may alternatively include other filters which have a tunable bandwidth, such as a fiber Bragg grating, Fabry-Perot filter, arrayed waveguide grating, multi-mode interference (MMI) coupler, thin-film filter, and a filter including a single closed-loop waveguide variably coupled to a Mach-Zehnder interferometer. Preferably, the transmission spectrum of tunable filter 922 substantially matches or conforms to the spectral envelope of the incoming optical signal in order to reduce optical noise signals input to photodetector 924. For example, as shown in FIG. 11, the incoming optical signal 902 supplied to tunable filter 922 may have a signal spectrum corresponding to curve 1101 that exceeds a background noise level 1102. Preferably, tunable filter 922 has a transmission characteristic or response 1103 that encompasses signal spectrum 1101. As a result, tunable filter 922 rejects or cuts out, out-of-band noise and thus improves system performance, for example, by improving the signal-to-noise ratio (SNR). The bandwidth of the tunable filter 922 is tuned to best match the effective bandwidth of optical signal 902. That is, the filter bandwidth is made as narrow as possible in order to reject as much noise as possible, while not impacting or rejecting the optical signal spectrum 1101.

Photodetector 924 supplies an electrical output 925, which is fed to control circuit 926. Control circuit 926 is configured to generate control signals 935 in response to electrical output 925. If filter 400 is employed, control signals 935, which may be in the form of a voltage or a current, are supplied to heaters in the tunable couplers of filter 922 to adjust the coupling ratios between the closed-loop waveguides, and, thus, the spectral width of the passband of tunable filter 922. Preferably, as noted above, control signals 935 are sufficient to adjust the spectral width of the passband so that the transmission spectrum of tunable filter 922 substantially matches the spectral width of incoming optical signal 902. Multiple control signals may be generated, each corresponding to a particular heater.

Preferably, a known performance monitoring circuit is included in control circuit 926 to monitor parameters such as the bit error rate (BER), signal-to-noise ratio (SNR), and signal quality (Q) of the optical output from tunable filter 922. Based on one or more of these parameters, known optimization algorithms may be applied by control circuit 926 to generate control signals that optimize (i.e. lower BER, or increase SNR or Q) one or more of these parameters.

As discussed above, by providing tunable coupling between each ring of the filter consistent with the present disclosure, the width of the passband can advantageously be varied, as well as the delay associated with optical signals having particular wavelengths.

Other embodiments of the invention will be apparent to those skilled in the art from consideration of the specification and practice of the invention disclosed herein. For example, although each of coupler connecting the closed-loop waveguides discussed above is described as being a tunable coupler, it is understood that a combination of fixed couplers and tunable couplers may be employed. For example, in filter 300 shown in FIG. 3, tunable coupler 112 may be replaced by a fixed coupler, while remaining couplers 108 and 104 are tunable. It is intended that the specification and examples be considered as exemplary only, with a true scope and spirit of the invention being indicated by the following claims.

What is claimed is:

1. An optical filter, comprising:
a substrate;
a plurality of looped waveguides provided on the substrate, each of which being configured as a closed loop;
a first plurality of tunable couplers provided on the substrate, each of the first plurality of tunable couplers including a corresponding first portion of each of the plurality of looped waveguides, and a corresponding one of a first plurality of heaters, each of the first plurality of heaters being thermally coupled to the corresponding first portion of said each of the plurality of looped waveguides; and
a second plurality of tunable couplers provided on the substrate, each of the second plurality of tunable couplers including a corresponding second portion of each of the plurality of looped waveguides, and a corresponding one of a second plurality of heaters, each of the second plurality of heaters being thermally coupled to the corresponding second portion of said each of the plurality of looped waveguides,
each of the first plurality of tunable couplers being configured to adjust an amount of optical coupling between corresponding first adjacent ones of the plurality of looped waveguides, and each of the second plurality of tunable couplers being configured to adjust an amount of optical coupling between corresponding second adjacent ones of the plurality of looped waveguides,
a first one of the first plurality of tunable couplers including a first Mach-Zehnder interferometer having first and second waveguides, which are spaced from one another, the first waveguide of the first Mach-Zehnder interferometer including a first part of a first one of the plurality of looped waveguides, and the second waveguide of the first Mach-Zehnder interferometer including a first part of a second one of the plurality of looped waveguides; and
a second one of the first plurality of tunable couplers including a second Mach-Zehnder interferometer having first and second waveguides, which are spaced from one another, the first waveguide of the second Mach-Zehnder interferometer including a second part of the second one of the plurality of looped waveguides, and the second waveguide of the second Mach-Zehnder interferometer including a part of a third one of the plurality of looped waveguides.

2. An optical filter in accordance with claim 1, further including:
an input waveguide configured to receive a plurality of optical signals, each of the plurality of optical signals having a corresponding one of a plurality of wavelengths, the input waveguide being coupled to the first one of the plurality of looped waveguides; and
an output waveguide coupled to the second one of the plurality of looped waveguides, the output waveguide supplying at least one of the plurality of optical signals.

3. An optical filter in accordance with claim 2, wherein the input waveguide extends parallel to the output waveguide.

4. An optical filter in accordance with claim 1, wherein each of the plurality of looped waveguides includes a material selected from the group consisting of: silicon oxynitride (SiON), silicon oxycarbide (SiOC), doped silica, doped glasses, silicon, polymers, InP, GaAs, and InGaAs.

5. An optical filter in accordance with claim 1, wherein each of the first plurality of heaters and each of the second plurality of heaters includes a thin film heater.

6. An optical receiver circuit, comprising:
an optical filter configured to receive an optical signal and supply an optical output, the optical filter including:
a plurality of looped waveguides provided on the substrate, each of which being configured as a closed loop; and
a first plurality of tunable couplers provided on the substrate, each of the first plurality of tunable couplers including a corresponding first portion of each of the plurality of looped waveguides, and a corresponding one of a first plurality of heaters, each of the first plurality of heaters being thermally coupled to the corresponding first portion of said each of the plurality of looped waveguides; and
a second plurality of tunable couplers provided on the substrate, each of the second plurality of tunable couplers including a corresponding second portion of each of the plurality of looped waveguides, and a corresponding one of a second plurality of heaters, each of the second plurality of heaters being thermally coupled to the corresponding second portion of said each of the plurality of looped waveguides,
each of the first plurality of tunable couplers being configured to adjust, in response to a corresponding one of a first plurality of control signals, an amount of optical coupling between corresponding first adjacent ones of the plurality of looped waveguides, and each of the second plurality of tunable couplers being configured to adjust, in response to a corresponding one of a second plurality of control signals, an amount of optical coupling between corresponding second adjacent ones of the plurality of looped waveguides, one of the first plurality of tunable couplers including a first Mach-Zehnder interferometer having first and second waveguides, which are spaced from one another, the first waveguide of the first Mach-Zehnder interferometer including a first part of a first one of the plurality of looped waveguides and the second waveguide of the first Mach-Zehnder interferometer including a seeend first part of a second one of the plurality of looped waveguides;

one of the second plurality of tunable couplers including a second Mach-Zehnder interferometer having first and second waveguides, which are spaced from one another, the first waveguide of the second Mach-Zehnder interferometer including a second part of the first one of the plurality of looped waveguides and the second waveguide of the Mach-Zehnder interferometer including a part of a third one of the plurality of looped waveguides; and a photodetector configured to receive the optical output from the optical filter and generate an electrical output; and a control circuit configured to generate at least one of the first plurality of control signals in response to the electrical output.

7. An optical receiver circuit in accordance with claim 6, further including:
an input waveguide configured to receive the optical signal, the input waveguide being coupled to the first one of the plurality of looped waveguides; and
an output waveguide coupled to the second one of the plurality of looped waveguides, the output waveguide supplying the optical output.

8. An optical filter in accordance with claim 7, wherein the input waveguide extends parallel to the output waveguide.

9. An optical receiver circuit in accordance with claim 6, wherein each of the plurality of looped waveguides includes a material selected from the group consisting of: silicon oxynitride (SiON), silicon oxycarbide (SiOC), doped silica, doped glasses, silicon, polymers, InP, GaAs, and InGaAs.

10. An optical receiver circuit in accordance with claim 6, wherein each of the first plurality of heaters and each of the second plurality of heaters includes a thin film heater.

11. An optical filter in accordance with claim 6, wherein the control circuit generates said at least one of the first plurality of control signals in response to a Q value associated with the output optical signal.

12. An optical filter in accordance with claim 6, wherein the control circuit generates said at least one of the first plurality of control signals in response to a signal-to-noise ratio (SNR) associated with the output optical signal.

13. An optical filter in accordance with claim 6, wherein the control circuit generates said at least one of the first plurality of control signals in response to a bit-error-rate (BER) associated with the output optical signal.

* * * * *